United States Patent [19]
Itou

[11] Patent Number: 5,588,703
[45] Date of Patent: Dec. 31, 1996

[54] LUMBAR SUPPORT DEVICE FOR VEHICLE SEAT

[75] Inventor: Kenichi Itou, Akishima, Japan

[73] Assignee: Tachi-S Co., Ltd., Tokyo, Japan

[21] Appl. No.: 542,190

[22] Filed: Oct. 12, 1995

[51] Int. Cl.⁶ .................................................. A47C 3/025
[52] U.S. Cl. ........................................................ 297/284.4
[58] Field of Search ........................................ 297/284.4

[56] References Cited

U.S. PATENT DOCUMENTS

| | | | |
|---|---|---|---|
| 3,807,794 | 4/1974 | Beyer | 297/284.4 |
| 4,148,522 | 4/1979 | Sakurada et al. | 297/284.4 |
| 4,182,533 | 1/1980 | Arndt et al. | 297/284.4 |
| 4,564,235 | 1/1986 | Hatsutta et al. | 297/284.4 |
| 4,886,316 | 12/1989 | Suzuyama et al. | 297/284.4 |
| 4,896,918 | 1/1990 | Hoshihara | 297/284.4 |
| 5,088,790 | 2/1992 | Wainwright et al. | 297/284.4 |
| 5,302,002 | 4/1994 | Nagasaka | 297/284.4 |
| 5,318,341 | 6/1994 | Griswold et al. | 297/284.4 X |
| 5,352,018 | 10/1994 | Arakawa et al. | 297/284.4 |
| 5,403,069 | 4/1995 | Inara et al. | 297/284.4 |

FOREIGN PATENT DOCUMENTS

| | | |
|---|---|---|
| 62-52457 | 4/1987 | Japan . |
| 63-103449 | 7/1988 | Japan . |
| 1-86848 | 6/1989 | Japan . |

Primary Examiner—Peter M. Cuomo
Assistant Examiner—Stephen Vu
Attorney, Agent, or Firm—Browdy and Neimark

[57] ABSTRACT

A lumbar support device to provided on a seat back frame of a vehicle seat. In this device, a crank-like torsion bar is rotatably secured on the seat back frame via a cramp member having a snap action element, and connected at its one end to a lanced bridge integral with a lumbar plate, without requiring any separate connecting element. Another end of the torsion is abutted on an adjustment cam which is also directly mounted in a cam support bracket, without any separate connecting element, the cam support bracket being fixed on the seat back frame. Additionally, removal prevention elements are integrally provided at connecting points among those torsion bar, cramp member, lumbar plate, cam and cam support bracket, in order to prevent them against removal from one another. Therefore, the number of constituent elements can be reduced and assembling of the lumbar support device may be expedited with great ease.

11 Claims, 4 Drawing Sheets

5,588,703

LUMBAR SUPPORT DEVICE FOR VEHICLE SEAT

BACKGROUND OF INVENTION

1. Field of the Invention

The present invention relates to a lumbar support device for use in a vehicle seat such as an automotive seat.

2. Description of Prior Art

Among various lumbar support devices provided in a vehicle or automotive seat and operable to adjustably support the lumbar part of an occupant sitting on the seat, there has been known such type of lumbar support device provided on a seat frame, wherein a lumbar plate is connected to one end of a torsion bar, and an adjustment element, such as a cam having discrete surfaces, is connected to another end of the same torsion bar, and wherein an operation lever is fixed to that adjustment cam, such that the lumbar plate member may be displaced in a direction toward and away from the occupant's lumbar part at a desired lumbar support position by rotational operation of the lever. A typical example of this sort of lumbar support device is disclosed from the Japanese Laid-Open U.M. Pub. No. 62-52457.

However, the conventional lumbar support devices, including that Japanese prior-art lumbar support device, has been found troublesome or inefficient in assembling its plural constituent elements or members together into a resulting lumbar support device, in view of the fact that the connection of the torsion bar to the lumbar plate and seat frame requires separate connecting elements or an additional step for machining or bending some local portions of the torsion bar subsequent to the same torsion bar being located or provisionally secured via support brackets on the lumbar plate and seat frame. This is also true with respect to the mounting of the cam in a cam support bracket fixed on the seat frame. Consequently, under this hitherto state of art, the assembly process is slow and cumbersome and requires an increase the number of separate connecting elements.

SUMMARY OF THE INVENTION

In view of the above-stated shortcomings, it is therefore a primary purpose of the present invention to provide an improved lumbar support device for use in a seat back of a vehicle seat which is simplified in structure and easy to be assembled.

In order to attain such purpose, the lumbar support device, in accordance with the present invention, basically comprises:

a lumbar plate having a connecting means provided integrally therein;

a crank-like torsion bar which is formed by bending one steel wire in a crank manner such as to have, defined therein, one end portion connected to the connecting means of lumbar plate, another free end portion, and a crank portion between the end portions;

a cramp means by which the crank portion of the crank-like torsion bar is rotatably fixed to the seat back frame;

a cam means having discrete cam surfaces on which a free end portion of torsion bar is abutted, which cam means includes a shaft means provided integrally therewith;

a bracket means including a hole means and a narrowed hole means communicating with the hole means, in which the bracket means and the cam means are rotatably supported, with the shaft means thereof being inserted through the narrowed hole means into the hole means; and an operation lever connected to one end of the shaft means of the cam means.

Preferably, the cramp means may be provided with a snap action means for permitting the crank portion of torsion bar to be snap inserted therethrough and rotatably secured in the cramp means.

Preferably, a removal prevention means may be included in the lumbar support device, which prevents the one end portion of torsion bar against removal from the connecting means.

Other specific features and advantages of the present invention will become apparent from reading of the descriptions with reference to the annexed drawings,

DETAILED DESCRIPTION OF PREFERRED EMBODIMENT OF THE INVENTION

Referring to FIGS. 1 to 7, there is shown a lumbar support device in accordance with the present invention, as generally designated at (D). As shown, the lumbar support device (D) is mounted at the lower horizontal frame section (50) and one lateral vertical frame section (51) of a seat back frame (5), which are to be provided within a seat back (SB) connected to a seat cushion (SC), of a vehicle or automotive seat (S).

Figure 1:
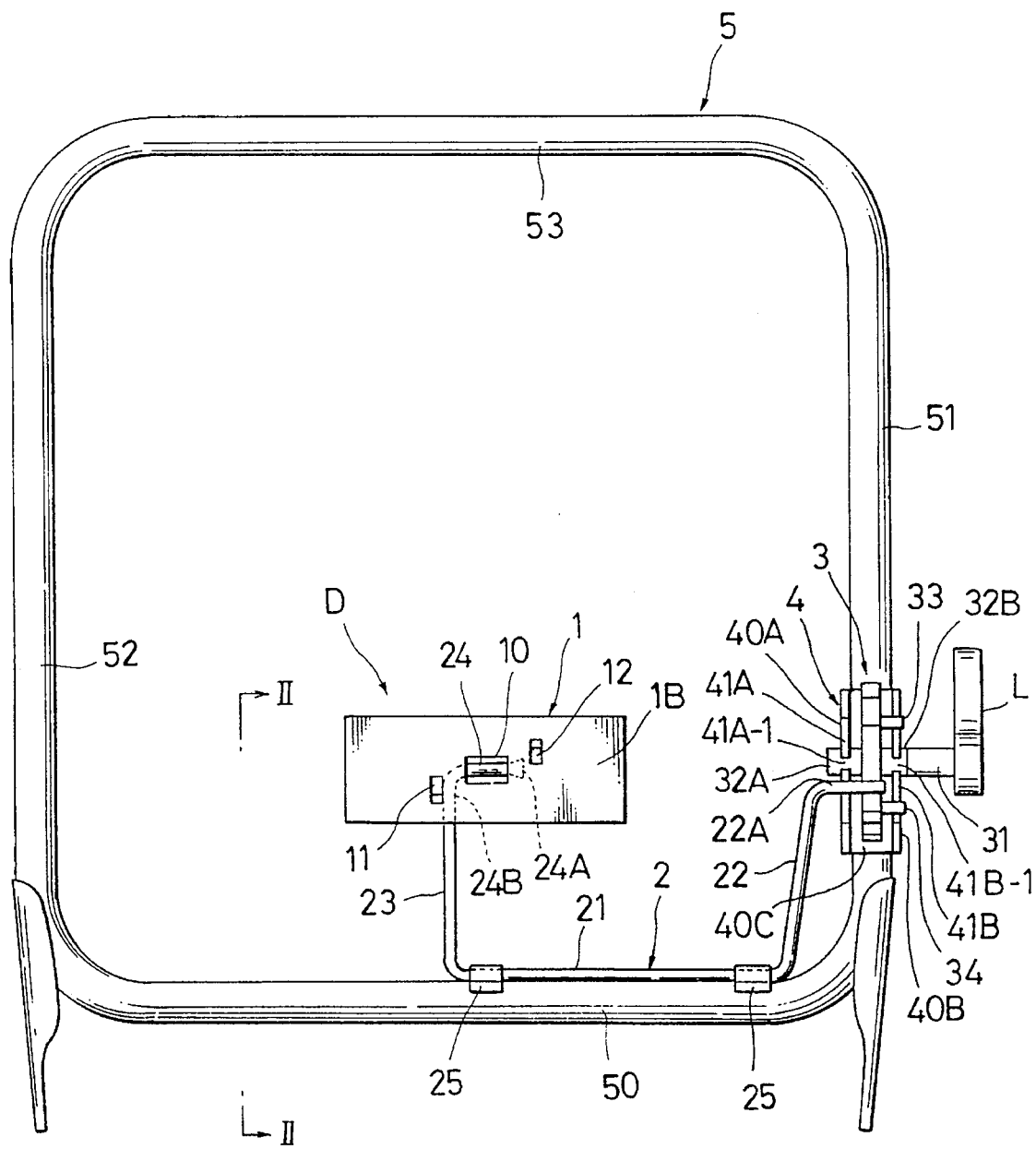
FIG. 1 is a schematic front view of a lumbar support device of the present invention as applied to a seat back frame.
Figure 4:
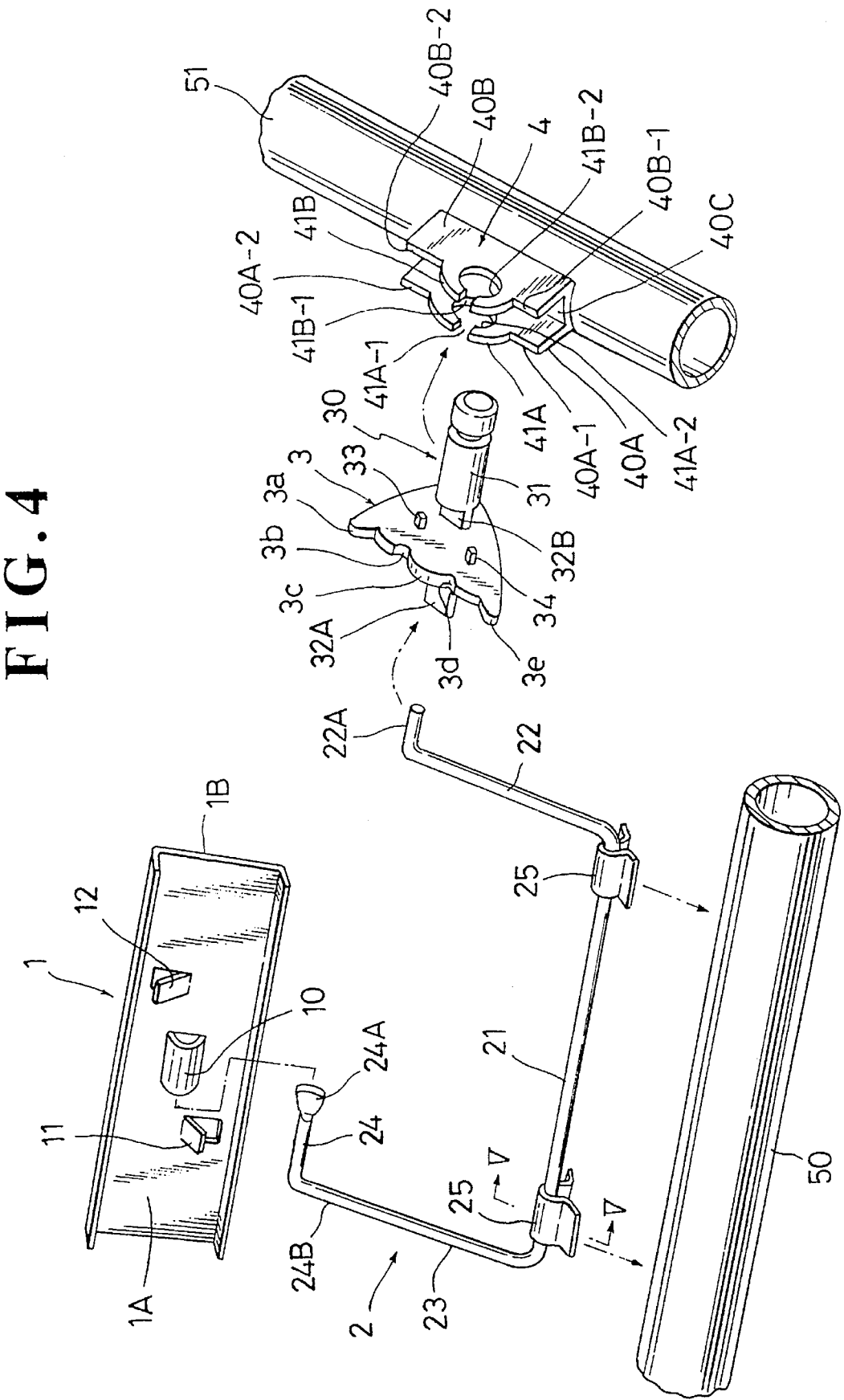
FIG. 4 is partly broken, schematic exploded perspective view of the lumbar support device.
Figure 5:
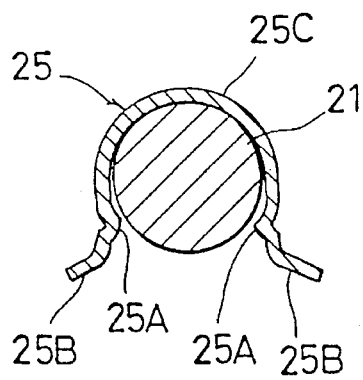
FIG. 5 is a sectional view taken along the line V—V in the FIG. 4.

As seen from FIGS. 1 and 4, the device (D) basically comprises: a crank-like torsion bar (2) of a circular cross-section rotatably mounted on the seat back frame (5), the torsion bar (2) having a first horizontally bent end portion (24) and a second horizontally bent end portion (22A); a lumbar plate (1) connected at the backward wall (1A) thereof to the first end portion (24) of the torsion bar (2), the lumbar plate (1) being to be displaced forwardly and backwardly of the seat back frame (5); an adjustment cam (3) having discrete cam surfaces (3a, 3b, 3c, 3d, 3e) upon which the second end portion (22A) of the torsion bar (2) is to be selectively abutted, thereby adjusting a supporting pressure of the lumbar plate (1) against a lumbar part of an occupant sitting on the seat (S); and a cam support bracket (4) in which the adjustment cam (3) is rotatably supported via a shaft (30). An operation lever (L) is fixed to the shaft (30).

The torsion bar (2) is formed by bending one steel wire in such a crank manner as to have, defined therein, a horizontal crank part (21), and a pair of vertical first and second crank parts (23)(22) each extending upwardly and at a right angle from the respective both ends of that horizontal crank part (21). As best seen from FIG. 2, the vertical first and second crank parts (23)(22) are twisted or inclined in a direction opposite to each other relative to the longitudinal axis of the horizontal crank part (21).

The first vertical crank part (23) has an upturned section (24B) bent upwardly therefrom at a generally right angle, from which is continuously formed the first horizontally bent end portion (24). The first horizontally bent end portion (24) is shown to extend at a right angle from the upturned section (24B) in a direction inwardly of the torsion bar body, i.e. in parallel with the horizontal crank part (21), and terminate in a flattened end (24A).

The second vertical crank part (22) is formed with the second horizontally bent end portion (22A) which extends at substantially a right angle therefrom in a direction outwardly of the torsion bar body.

A pair of cramp members (25)(25) are rotatably fitted about the horizontal crank part (21) of torsion bar (2). The cramp members (25) are each formed in a generally omega (Ω) shaped cross-section, as in FIG. 5, having a generally semi-circular cramp body (25C) whose inner diameter is greater than the diameter of the torsion bar (2), a pair of spaced-apart securing leg parts (25B)(25B), and a pair of spaced-apart inwardly projected parts (25A)(25A), all in an integral manner. As understandable from FIG. 5, the two projected parts (25A) are formed in the neck portion of the cramp member defined between the two lower spaced-apart ends of cramp body (25C) and two spaced-apart securing leg parts (25B) each extending respectively from those two cramp body lower ends, such as to project toward each other, with an opening given therebetween. Such opening between the two projected parts (25A) should have a distance permitting the horizontal crank part (21) to be snap inserted therethrough into within the cramp body (25C), as in FIG. 5, so that the horizontal crank part (21) may be rotatably retained within the cramp body (25C) against removal therefrom. For that purpose, the cramp members (25) be formed from a metallic material having a certain resiliency to give a snap action to those projected parts (25A). As will be stated later, the securing leg parts (25B) of this cramp member (25) are welded to the lower horizontal frame section (50) of seat back frame (5) in order to rotatably connect the torsion bar (2) thereto.

The lumbar plate (1), as shown in FIG. 4, is of a rectangular shape having a backward surface (1A) and a forward surface (1B). In the backward surface (1A) of this lumbar plate, a generally semi-elliptic lanced bridge (10) is formed integrally at a central point, by lancing and projecting the corresponding area of the lumbar plate (1) from the backward surface (1A) in a generally semi-elliptic fashion, defining thus a pair of generally semi-elliptic through-holes at the respective both lateral sides thereof such that the through-holes are both long in the direction of major axis and short in the direction of minor axis, from the viewpoint of elliptic geometry. In this regard, according to the present invention, it is important that the major-axis-wise lengths of both such semi-elliptic through-holes should be slightly greater than the width of the flattened end (24A) of torsion bar (2) whereas the minor-axis-wise lengths of them be smaller than the same torsion bar flattened end (24A), yet greater than the diameter of first bent end portion (24) of torsion bar (2). This not only permits insertion of both torsion bar's flattened end (24A) and first bent end portion (24) through the lanced bridge (10), but also prevents removal of the lumbar plate (1) from the first bent end portion (24) by the reason of such flattened end (24A) being normally positioned at the minor axis side of semi-elliptic through-hole of lanced bridge (10), as will be explained later.

Further, integrally formed in the same lumbar plate backward surface (1A) are a pair of first and second detent lugs (11)(12) such as to be disposed symmetrically relative to and spaced apart a given distance from the lanced bridge (10), by stamping and bending out the corresponding two areas of lumbar plate (1) from the backward surface (1A). As shown, the first and second detent lugs (11)(12) are arranged on the lumbar plate backward surface (1A) such that they are bent and inclined upwardly in a direction opposite to each other in relation to a horizontal line extending through the longitudinal axis of the lanced bridge (10). In the illustrated embodiment, the first detent lug (11) will serve to prevent removal of the torsion bar (2) from the lanced bridge (10) when the flattened end (24A) of torsion bar (2) is positioned in alignment with the major axis of the semi-elliptic through-holes of lanced bridge and about to pass therethrough. To enhance such removal prevention, the torsion bar (2) should preferably be formed with the upturned part (24B) between the first bent end portion (24) and first lateral crank part (23) thereof in an attempt to keep the corresponding portion (at 24B) of torsion bar in contact with the detent lug (11 or 12) when the lumbar plate (10) is rotated upwardly about the first bent end portion (24).

Figure 6:
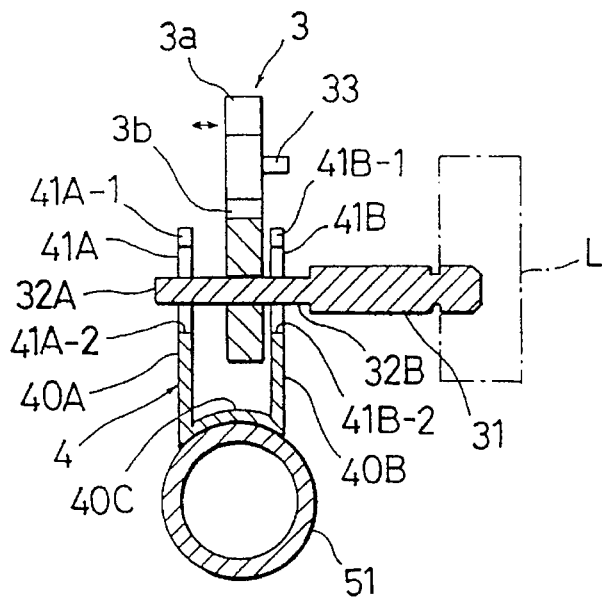
FIG. 6 is a sectional view taken along the line VI—VI in the FIG. 2.

As best shown in FIGS. 4 and 6, the adjustment cam (3) is shown as having the shaft (30) fixed integrally thereto in an eccentric manner. The shaft (30) is formed by a first square shaft portion (32A), a second square shaft portion (32B), wherein both first and second square shaft portions (32A)(32B) have a same rectangular cross-section, and a round shaft portion (31) having a circular cross-section, in such a manner that the first and second square portions (32A)(32B) project from the opposite lateral walls of the cam (3). The round shaft portion (31) is integrally defined at the second square portion (32B). The operation lever (L) is fixed to a free end portion of that round shaft portion (31) of shaft (30).

The cam support bracket (4) is so formed to define a base securing wall (40C), a pair of first and second upstanding walls (40A)(40B) extending upwardly from both sides of the base securing wall (40C), a pair of protuberant parts (41A)(41B) each being integrally formed on the first and second upstanding walls (40A)(40B), respectively, a pair of first and second circular holes (41A-2)(41B-2) each being formed in the two protuberant parts (41A)(41B), respectively, and a pair of slits (41A-1)(41B-1) each being formed in the respective top portions of the two protuberant parts (41A)(41B) and communicating with those two circular holes (41A-2)(41B-2), respectively. Designations (40A-1)(40A-2) denote first and second shoulder parts of the first upstanding wall (40A), respectively, which are defined on the opposite sides of the protuberant part (41A). Also, designations (40B-1)(40B-2) denote first and second shoulder parts of the second upstanding wall (40B), respectively, which are defined on the opposite sides of the other protuberant part (41B). As shown, this bracket (4) is fixed on one lateral vertical frame section (51) of the seat back frame (5) by welding the base securing wall (40C) of bracket (4) thereto.

It is noted here that both two slits (41A-1)(41B-1) should be opened slightly greater than the thickness of both first and second square shaft portions (32A)(32B) of shaft (30), thus permitting both two square shaft portions (32A)(32B) to be inserted through the respective two slits (41A-1)(41B-1) into the respective two circular holes (41A-2)(41B-2), whereas both two circular holes (41A-2)(41B-2) should have a diameter generally equal to or slightly greater than the width of the same square shaft portions (32A)(32B), which permits both two square shaft portions (32A)(32B) to be rotatably received within the respective tow circular holes (41A-2)(41B-2).

First and second stopper pieces (33)(34) are integrally formed on one lateral wall of the cam (3), which serve to limit the upward and downward rotation of the cam (3) in order to prevent the first and second square shaft portions (32A)(32B) of shaft (30) against removal from the respective slits (41A-1)(41B-1) of cam support bracket (4), as will be described later.

Accordingly, by virtue of the above-stated constituent elements, the lumbar support device (D) can be easily assembled, as shown in FIG. 4, through the simple steps of: (i) welding the cam support bracket (4) to a predetermined point on one lateral frame section (51) of seat back frame (5); (ii) mounting the cam (3) in the cam support bracket (4) by inserting both first and second square shaft portions (32A)(32B) of shaft (30) through the respective two slits (41A-1)(41B-1) of cam support bracket (4) into the respective two holes (41A-2)(41B-2) of the same (4), thereby mounting the cam (3) rotatably on the lateral frame section (51) of seat frame (5); (iii) then, snap securing the two cramp members (25)(25) about the horizontal crank part (21) of torsion bar (2); (iv) welding the the respective securing leg parts (25B) of two cramp members (25) at a predetermined point on the lower frame section (50) of seat frame (5), with the second bent end portion (22A) of torsion bar (2) being in contact upon one of the discrete cam surfaces (3a, 3b. . . ) of cam (3); and (v) securing the lumbar plate (1) to the torsion bar (2) by inserting both first bent end portion (24) and flattened end (24A) of torsion bar (2) through the two semi-elliptic through-holes of lanced bridge (10) and disposing the upturned portion (24B) of torsion bar (2) between the first detent lug (11) and one lateral end of the lanced bridge (10) adjacent thereto. In this assembly process care should be taken to insure that, when connecting the torsion bar (2) to the lumbar plate (1), the torsion bar (2) is oriented in a direction orthogonal with the flat backward surface (1A) of lumbar plate (1) such as to align the flattened end (24A) of torsion bar (2) with the major axis of both semi-elliptic through-holes of lanced bridge (10), while laying the first bent end portion (24) of torsion bar (2) above the first detent lug (11). In that way, both torsion bar's first end portion (24) and flattened end (24A) can be smoothly inserted through the lanced bridge (10) without interference with the first detent lug (11). Also, care should be taken that, when inserting the two square shaft portions (32A)(32B) of cam (3) into both slits (41A-1)(41B-1) and circular holes (41A-2)(41B-2) of bracket (4), respectively, the lateral wall of cam (3) where the two stopper pieces (33)(34) are provided should be kept in contact with one lateral side of bracket (4) corresponding to its first upstanding wall (40A) and protuberant part (41A), so as to allow both cam (3) and stopper pieces (33)(34) to be bodily inserted into and between the two upstanding walls (40A)(40B) of bracket (4). Thus, the cam (3) may be smoothly located in the bracket (4) without the two stopper pieces (33)(34) interfering and contacting therewith. Thereafter the cam (3) may be displaced within the bracket (4) along the longitudinal axis of the shaft (3) away from that one lateral side of bracket (4) (i.e. at (40A) and (41A)) to the degree at which one of the two stopper pieces (33)(34) contacts each of their mating shoulder parts (40B-1)(40B-2) of bracket (4). As stated previously, this will limit the upward and downward rotation of cam (3) and prevent both square shaft portions (32A)(32B) from being rotated to an angle at which they can be slid through the respective two slits (41A-1)(41B-1) and removed from the respective circular holes (41A-2) (41B-2), as can be seen from FIG. 2 and 3. For that purpose, as best seen in FIG. 6, the two upstanding walls (40A)(40B) of cam support bracket (4) should be spaced apart from each other a distance greater than both thickness of cam (3) and the projecting length of the two stopper pieces (33)(34) in aggregation, such as to allow the foregoing displacement of both cam (3) and stopper pieces (33)(34) between the two upstanding walls (40A)(40B) as indicated by the arrow in FIG. 6, whereby the cam (3) is ready to be mounted into or removed from between the two upstanding walls (40A)(40B) without interference of the stopper pieces (33)(34).

Figure 2:
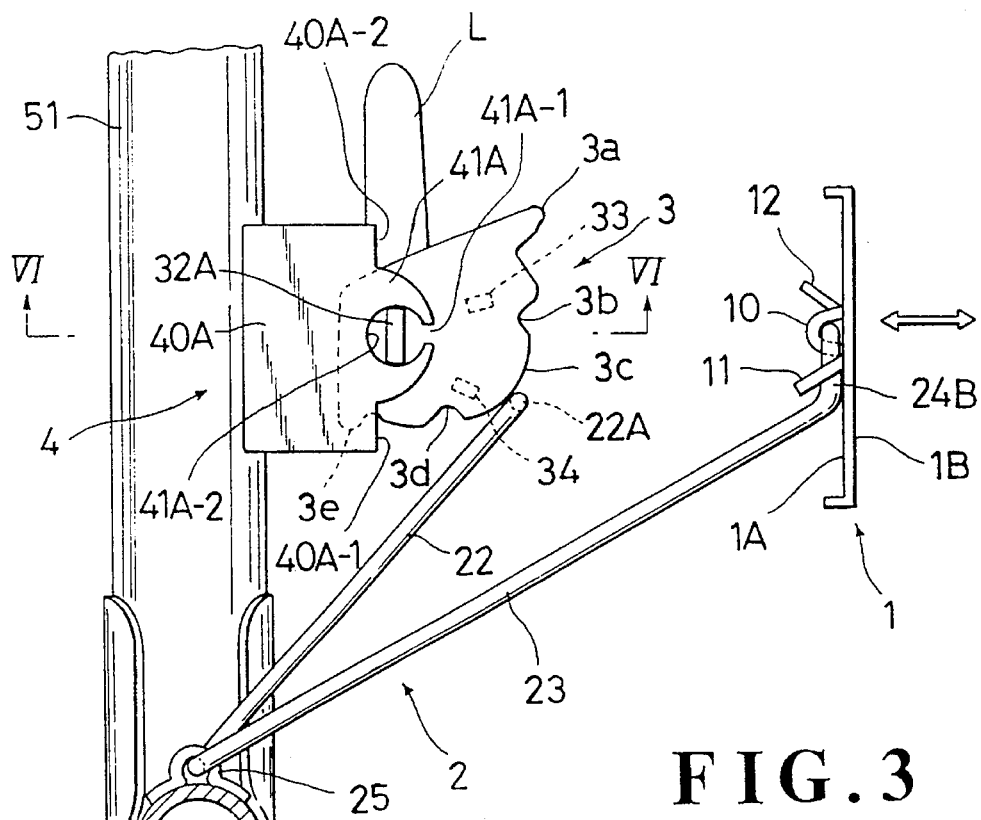
FIG. 2 is a partial sectional view taken along the line II—II in the FIG. 1.
Figure 3:
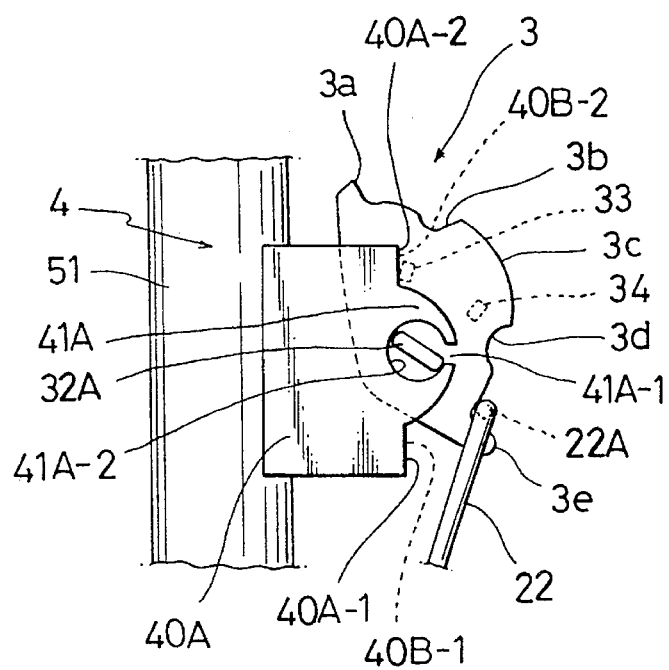
FIG. 3 is a fragmentary schematic view of a cam and cam support bracket of the lumbar support device.

In this connection, it is essential that the two stopper pieces (33)(34) should be disposed on the cam (3) to establish such an angular relation with the square shaft portions (32A)(32B) that, by way of one example shown in FIGS. 2 and 3, when the cam (3) is rotated upwardly from the position in FIG. 2 to the state in in FIG. 3, the first stopper piece (33) is brought to contact with the first shoulder part (40B-2) of bracket (4), thereby limiting further upward rotation of the cam (3) and preventing the square shaft portions (32A)(32B) against rotation to an angle at which they may be slid through the respective two slits (41A-1)(41B-1) out of the bracket (4). Although not shown clearly, it is to be understood from FIGS. 2 and 3 that, conversely, when the cam (3) is rotated downwardly from the position in FIG. 2, the second stopper piece (34) is brought the contact with the second shoulder part (40B-1) of bracket (4), thus limiting further downward rotation of the cam (3) and preventing the square shaft portions (32A)(32B) against rotation to an angle at which they may be slid through the respective two slits (41A-1)(41B-1) out of the bracket (4). Of course, the design of cam (3) per se and the disposition of the stopper pieces (33)(34) on the cam (3) relative to the square shaft portions (32A)(32B) are not limited to the embodiment shown in the figures, but may be altered in a proper manner insofar as they achieve the lumbar support pressure adjustments and prevent the square shaft portions (32A)(32B) from sliding removal from the respective slits (41A-1)(41B-1).

Additionally, the backward surface (1A) of lumbar plate (1) can be readily connected to the first bent end portion (24) of torsion bar (2) without taking any care about positioning the body of lumbar plate (1) in its vertical normal and reversed directions, because of the two detent lugs (11)(12) being symmetrically disposed relative to the lanced bridge (10) and stamped out vertically of the lumbar plate (1) in a direction opposite to each other.

Accordingly, in accordance with the present invention, once the cam support bracket (4) is welded to the lateral frame section (51) of seat frame (5), the cam (3) can be directly mounted therein, and once the torsion bar (2) is welled via the two cramp members (25) to the lower horizontal frame section (50) of seat frame (5), the lumbar plate (1) can be directly connected at the backward side (1A) to one end of the torsion bar (2), with another end of the torsion bar (2) being abutted on the cam (3), without any need for separate connecting elements or additional steps for machining or bending the connecting portions of torsion bar (2), lumbar plate (1), cam (3) and cam support bracket (4) after having interconnected them all, as found in the prior art. The construction of present invention is therefore much simplified in assembling its constituent elements together and minimizing the number of the same elements, so that the lumbar support device can be easily and quickly assembled to the seat back frame.

Figure 7:
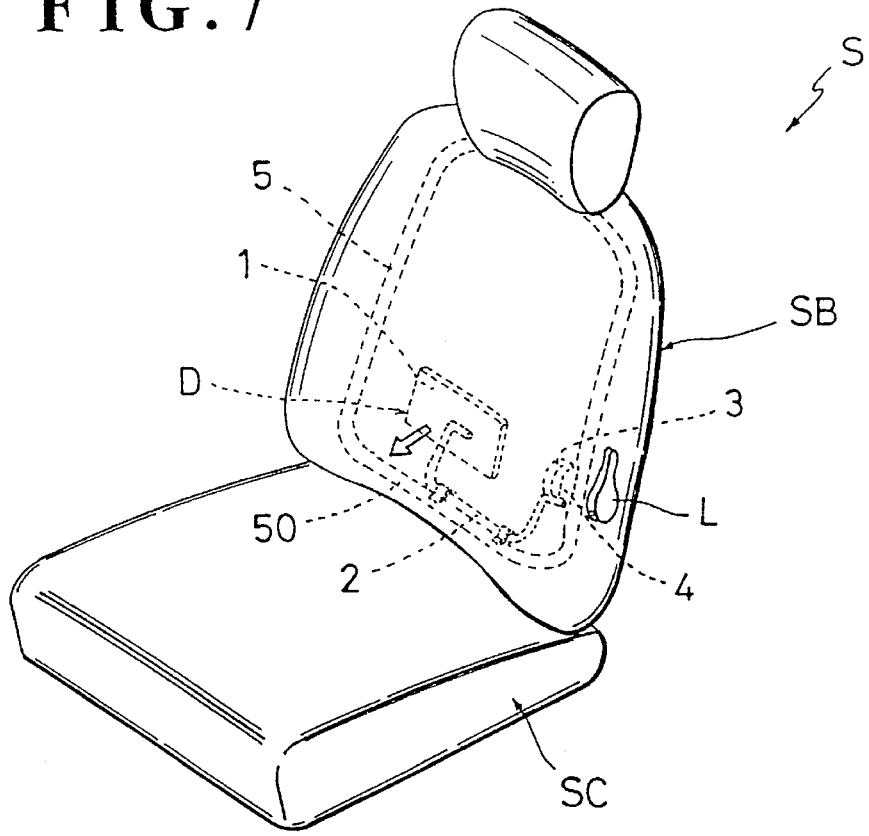
FIG. 7 is a schematic perspective view of a vehicle seat in which the lumbar support device is provided.

With the lumbar support device (D) constructed above, briefly stated, rotation of the operation lever (L) causes the lumbar plate (1) forwardly and backwardly of the seat back frame (5) as indicated by the arrows in FIGS. 2 and 7, and permits for adjusting a pressure degree of the lumbar plate (1) against a lumbar part of an occupant sitting on the seat (S) through rotation of the adjustment cam (3).

Finally, it should be understood that the present invention is not limited to the illustrated embodiment, but any other modifications, replacements and additions may be structurally applied thereto without departing from the scope of the appended claims.

What is claimed is:

1. A lumbar support device in a vehicle seat, the vehicle seat having a seat back and a seat back frame within the seat back, said lumbar support device comprising:

a lumbar plate having a connecting means provided integrally therein;

a torsion bar having a first end portion connected to said connecting means of said lumbar plate, a second end portion, and a crank portion integrally engaged between said first end portion and said second end portion;

a cramp means by which said crank portion of said torsion bar is rotatably fixed to said seat back frame;

a cam means having discrete cam surfaces on which said second end portion of said torsion bar is slidably engaged, said cam means having a shaft means provided integrally therewith;

a bracket means having a hole means with a narrowed hole means communicating with said hole means, said cam means being rotatably supported in said hole means after said shaft means on said cam means is inserted through said narrowed hole means into said hole means; and an operation lever connected to one end of said shaft means of said cam means;

wherein said cramp means is provided integrally with a snap action means for permitting said crank portion of said torsion bar to be snap inserted therethrough and rotatably secured in said cramp means;

wherein said cramp means comprises at least one generally omega shaped cramp member having a generally circular body in which said crank portion of said torsion bar is rotatably secured and a securing leg portion to be welded to said seat back frame, and wherein said snap action means comprises at least one projected part formed integrally in a neck portion of said generally omega shape cramp member between said generally circular body and said securing leg portion.

2. The lumbar support device according to claim 1, wherein said connecting means comprises a lanced bridge which is formed by lancing and projecting a part of said lumbar plate in order to have a pair of through-holes defined respectively at both lateral sides thereof, and wherein said first end of said torsion bar is inserted through said lance bridge from one of said pair of through-holes.

3. The lumbar support device according to claim 1, wherein said device further comprises a removal prevention means for preventing said first end portion of said torsion bar against removal from said connecting means of said lumbar plate.

4. The lumbar support device according to claim 3, wherein said removal prevention means comprises a projected detent lug which is formed integrally on said lumbar plate at a point adjacent to said connecting means, so that said first end portion of said torsion bar is prevented by said projected detent lug against removal from said connecting means of said lumbar plate.

5. The lumbar support device according to claim 4, wherein said connecting means comprises a generally semi-elliptic lanced bridge which is formed by lancing and projecting a part of said lumbar plate in a generally semi-elliptic fashion, with a pair of generally semi-elliptic through-holes defined at both lateral sides thereof, said pair of generally semi-elliptic through-holes corresponding to said generally semi-elliptic hole means, wherein said first end portion of said torsion bar is inserted through said generally semi-elliptic lanced bridge from one of said pair of through-holes so that said flattened end thereof projects from another of the pair of through-holes, and a pair of said projected detent lugs are arranged in symmetric position relative to and spaced apart a predetermined distance from said generally semi-elliptic lanced bridge.

6. The lumbar support device according to claim 4, wherein a pair of said projected detent lugs are arranged on said lumbar plate in symmetric position relative to and spaced apart a predetermined distance from said connecting means of said lumbar plate.

7. The lumbar support device according to claim 6, wherein said pair of projected detent lugs are formed by stamping and bending out two spaced-apart parts of said lumbar plate in such a manner that they are inclined in a direction opposite to each other relative to said connecting means of said lumbar plate.

8. The lumbar support device according to claim 3, wherein said removal prevention means comprises a generally semi-elliptic hole means defined in said connecting means of said lumbar plate, a flattened end part defined in said first end portion of said torsion bar, said flattened end part having a width generally equal to a major-axis-wise length of said generally semi-elliptic hole means, and a projected detent lug which is formed integrally on said lumbar plate at a point adjacent to said generally semi-elliptic hole means, and wherein said one end portion of said torsion bar is inserted through said generally semi-elliptic hole means, with said flattened end part thereof being projected from the same generally semi-elliptic hole means, to thereby be connected to said connecting means and prevented against removal therefrom by said projected detent lug, while being also prevented against removal therefrom by said flattened end part during rotation of said lumbar plate about said first end portion of said torsion bar.

9. The lumbar support device according to claim 1, wherein said shaft means of said cam means includes a square shaft portion of a generally rectangular cross-section, wherein said hole means and said narrowed hole means comprise a circular hole and slot, respectively, wherein said slot is of a size slightly greater than a thickness of said square shaft portion of said shaft means, which permits said square shaft portion to be inserted therethrough into said circular hole.

10. The lumbar support device according to claim 1, wherein said cam means is provided integrally with a stopper means for not only limiting a range within which said cam means is rotatable relative to said hole means of said bracket means, but also prevents said shaft means of said cam means against removal from said narrowed hole means of said bracket means.

11. The lumbar support device according to claim 10, wherein said shaft means of said cam means includes a square shaft portion of a generally rectangular cross-section, wherein said square shaft portion is inserted through said narrowed hole means into said hole means, so that said cam means is rotatable in upward and downward directions relative to said hole means, wherein said stopper means comprises at least two stopper pieces which are integrally projected from one lateral wall of said cam means, and wherein said at least two stopper pieces are disposed as to establish an angular relation with said square shaft portion in order for said cam means to be rotated in one of said upward and downward directions, one of said at least two stopper pieces is brought into contact with said bracket means, thereby limiting an upward or downward rotation of said cam means and stopping excessive rotation of said square shaft portion to an angle at which it may be slid through said narrowed hole means out of said bracket means.

* * * * *